May 10, 1938.  A. F. HICKMAN  2,116,516
VEHICLE SPRING SUSPENSION
Filed Nov. 10, 1934  3 Sheets-Sheet 1
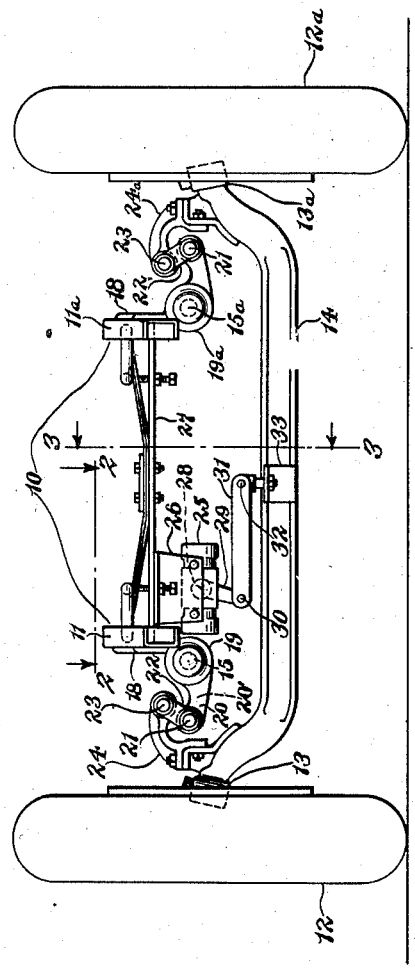
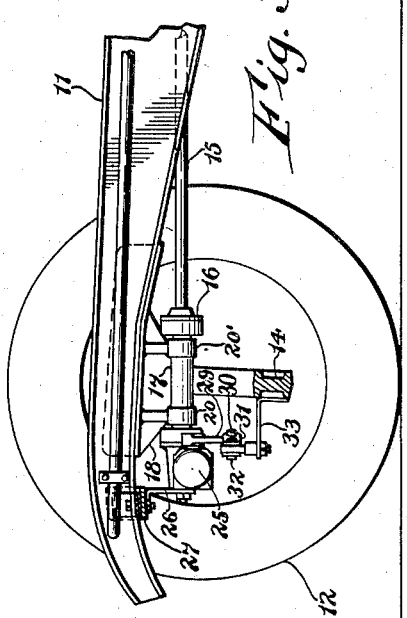
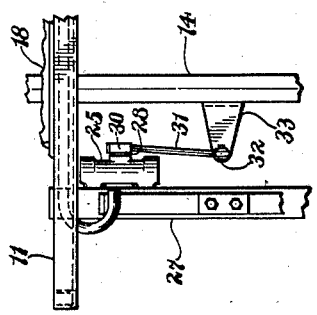
INVENTOR
Albert F. Hickman
BY
Popp & Popp
ATTORNEYS

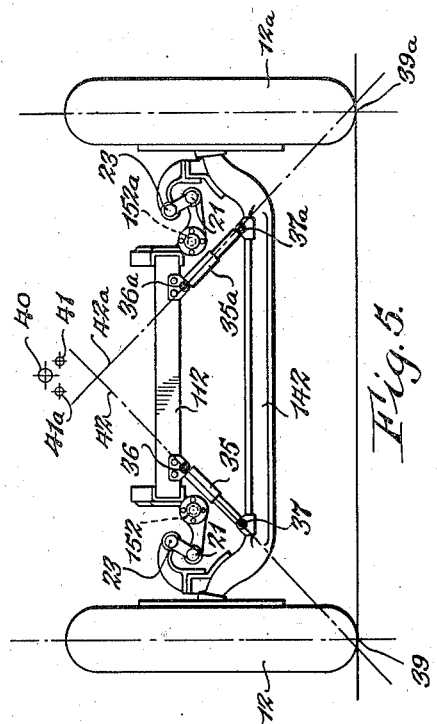

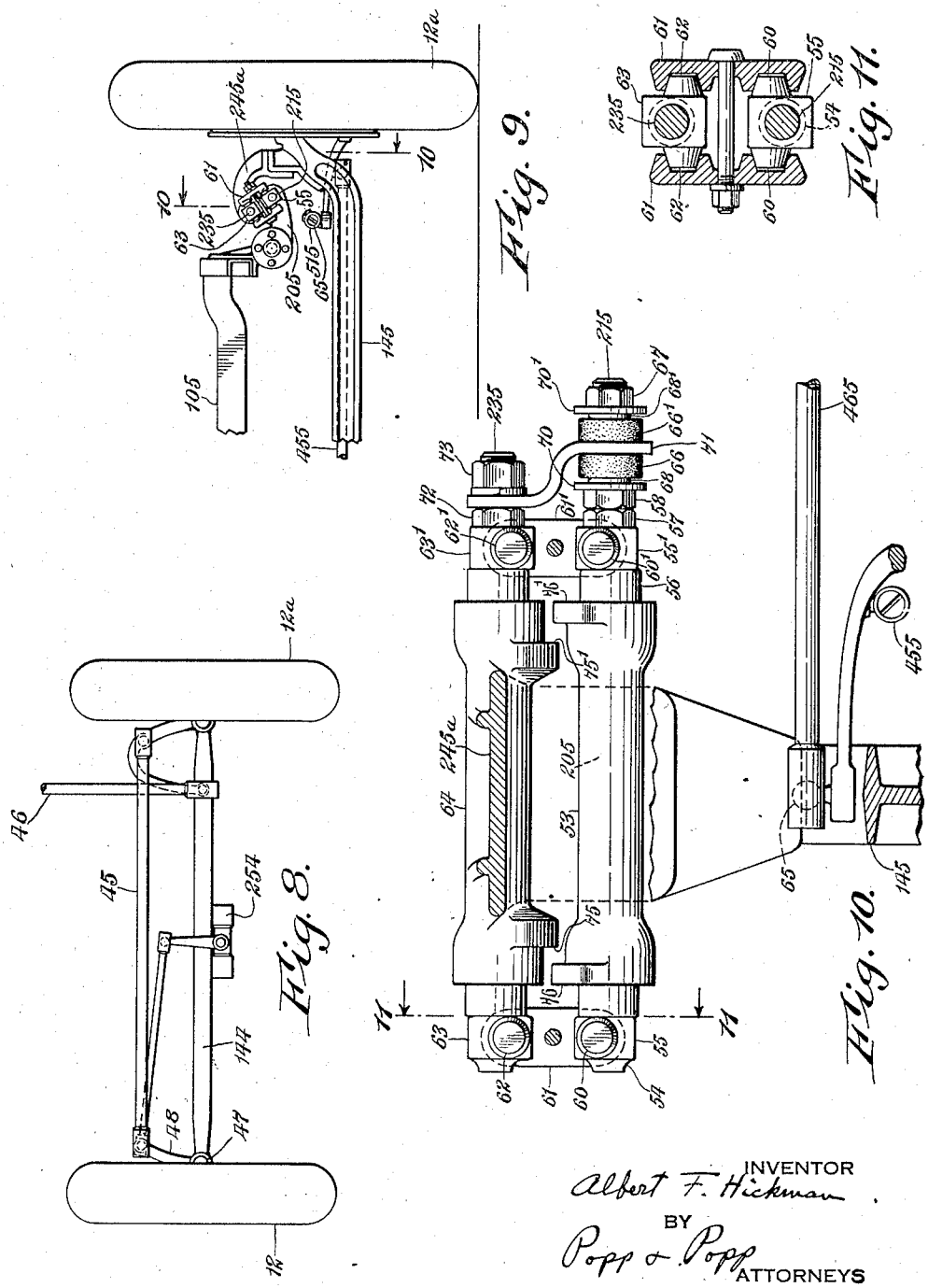

Patented May 10, 1938

2,116,516

UNITED STATES PATENT OFFICE 2,116,516

VEHICLE SPRING SUSPENSION

Albert F. Hickman, Eden, N. Y., assignor to Hickman Pneumatic Seat Co., Inc., Eden, N. Y., a corporation of New York Application November 10, 1934, Serial No. 752,488

5 Claims. (Cl. 267—57)

This invention relates to a vehicle spring suspension, and more particularly to a spring suspension of the type in which the vehicle wheels are permitted to move in a horizontal, lateral direction, as well as into a vertical direction, relatively to the frame of the vehicle and are resiliently urged horizontally and laterally toward a central or normal position, as well as resiliently urged downwardly.

This application is a continuation-in-part of my copending application for Vehicle spring suspension, Ser. No. 713,161, filed February 27, 1934.

The principal object of the invention is to most effectively control the horizontal movement of the vehicle wheels in the one or other direction away from their normal position, and at the same time to most effectively dampen excessively rapid vertical movement of said wheels. Numerous other collateral objects of the invention and practical solutions thereof are disclosed in detail in the herein patent specification, wherein, In the accompanying drawings:

Fig. 1 is an end elevation of a vehicle equipped with one form of my invention.

Fig. 2 is a fragmentary top plan thereof, taken on line 2—2, Fig. 1.

Fig. 3 is a fragmentary, vertical, longitudinal section thereof taken on line 3—3, Fig. 1.

Fig. 4 is an end elevation of a vehicle equipped with a modified form of my invention in which movement of the axle in a horizontal and transverse direction, relatively to the vehicle frame, is positively controlled.

Fig. 5 is an end elevation of a vehicle equipped with another modified form of my invention by which the forces caused by a movement of one end of the axle is absorbed without causing a tilting of the vehicle frame.

Fig. 6 is similar to Fig. 5, but showing one of the vehicle wheels in an elevated and the other vehicle wheel in a depressed position.

Fig. 7 is an end elevation of a vehicle equipped with still another modified form of the invention.

Fig. 8 is a fragmentary top plan of a vehicle illustrating yet another modified form of the invention.

Fig. 9 is a fragmentary front end elevation of a vehicle showing the kick shackle form of my invention.

Fig. 10 is a fragmentary enlarged vertical long section thereof, taken on line 10—10, Fig. 9.

Fig. 11 is a fragmentary, enlarged, vertical transverse section thereof, taken on line 11—11, Fig. 10.

Similar characters of reference indicate like parts in the several figures of the drawings.

Figures 1-3

In the particular disclosure of the invention shown in Figs. 1-3 of the accompanying drawings, the frame 10 of the vehicle is constructed in the usual and well known manner of a pair of substantially horizontal and longitudinal frame bars 11 and 11a of channel-shaped cross section. The front end of said vehicle frame is supported upon a pair of front, steering or dirigible wheels 12 and 12a which are suitably journaled on companion steering spindles 13 and 13a, the latter being pivoted at the outer ends of the axle 14 and cross connected in the usual and well known manner.

The present invention applies more particularly to the front end of a vehicle, but is applicable to the rear end of a vehicle as well, in which latter case the movable steering spindles 13 and 13a may be eliminated and the wheels journaled directly on rear axle spindles which are secured integrally or otherwise directly to the outer ends of the rear axle or of the rear axle housing. The use of the word "spindle" as applied to the outer ends of the rear axle is rendered necessary by reason of the fact that the present invention may be applied to both the front and rear ends of the vehicle. For simplicity, however, the drawings and description in this case have been confined to the front end of the vehicle.

The resilient connection between the front axle 14 and the frame 10 may be effected in various ways, but preferably in the general manner shown in my co-pending patent application for "Vehicle spring suspension", Ser. No. 713,161, filed Feb. 27, 1934. In this construction a pair of vehicle springs in the form of torsion rods 15 and 15a are disposed horizontally and longitudinally on the frame 10 of the vehicle and are suitably connected at their rear ends with said frame so as to resist the torsional forces which are imposed upon the torsion rods. The forward end of each of said torsion rods 15 and 15a is provided with a universal or other coupling 16 and is journaled at its front end in the long bearing 17 of a bracket 18 suitably secured to its companion frame bar 11 or 11a as the case may be. The extreme front of the torsion rods are provided with shock absorbers 19 and 19a which dampen excessively rapid vertical movements of the vehicle wheels.

Secured to each torsion rod 15 and 15a are a pair of outwardly extending crank arms 20 and 20' which are provided at their outer ends with supporting pivots 21. Shackles or links 22 are connected at their lower ends with said supporting pivots 21 and extend upwardly and inwardly therefrom and are pivoted at their upper ends at 23 on companion axle brackets 24 and 24a. The reason for this particular oblique arrangement of each pair of links 22 is to cause the thrust at the pivots 23 to be in such direction as to approximately intersect the surface of companion dirigible wheel 12 or 12a at its point of contact with the roadway. Such an arrangement prevents wheel tramp (as far as this particular factor is concerned) inasmuch as the lifting or depressing of one of said dirigible wheels 12 or 12a does not cause a lifting or depressing of the other dirigible wheel.

This oblique arrangement of the links 22 has another function,—namely to permit the axle 14 to move a restricted distance away from its central or normal position in a direction which is lateral and substantially horizontal relatively to the frame 10 of the vehicle. This lateral movement of said axle prevents a direct shock from being imparted to the frame 10 of the vehicle when a road irregularity causes a thrust against the dirigible wheels in a direction which is lateral and substantially horizontal relatively to the vehicle frame. This arrangement also permits the one or other end of the axle to rise or fall without imparting the horizontal component of such a movement directly to the vehicle frame. It is, however, essential that some force be employed to at all times urge the axle to its central or normal position shown in the drawings. This may be effected, if desired, by resilient means, but the preferred method is, as shown, to employ the force of gravity to accomplish this "centering" of the axle relatively to the vehicle frame. This self-centering action is obtained by reason of the oblique arrangement of the links 22,—the force of gravity which is acting upon the frame (and body) of the vehicle tending to move the axle and/or frame to the position shown in the drawings.

It will be seen from the foregoing that the force of gravity acting upon the frame 10 (and body) of the vehicle is, in effect, a resilient force urging the said frame and the axle 14 to assume a central or normal position relatively to each other in a direction which is lateral and substantially horizontal of said frame. By reason of the resilient nature of this centering force, it follows that when displacement occurs, there is created a force which tends to cause periodic vibration in the same manner as a pendulum tends to vibrate back and forth after it has been moved away from its central position and then released.

It is one of the objects of the present invention to rapidly dampen out any such transverse periodic vibrations of the axle 14 together with the rest of the unsprung weight connected therewith.

This result is obtained by absorbing a certain portion of the energy which is causing the axle 14 to move to one or other side of its central or normal position. This absorption of energy is effected, in the construction shown in Figs. 1-3, by a horizontal and transversely disposed hydraulic shock absorber 25 of the cylindrical piston type suitably secured to a depending bracket 26 of the cross frame member or tie bar 27. Said shock absorber 25 is preferably of the two-way type having resistance characteristics which are identical at both sides of its normal position. It is preferred that said shock absorber be of the type in which substantially no resistance to movement is offered until it has moved a short distance to the one or other side of its central or normal position. Such a construction is preferred in that it permits small lateral movements of the axle relatively to the frame without causing any lateral thrusts to be imposed upon said frame. It is to be understood that this small amount of free movement is so small that substantially no lateral periodic vibrations can be established within its range of movement. This small amount of free movement is particularly desirable by reason of the fact that the force which tends to centralize the axle 14 relatively to the frame 10 is very weak when said axle is at or near its central position. This is due to the fact that when said axle 14 is at or near its central position, the acting lever arms of the pivots 21 and 23 are relatively small in amount and are opposed to each other, whereas, when said axle 14 moves a relatively large distance away from its central position, the lever arm of the one pair of pivots 21, 23 becomes relatively large, while the lever arm of the other pair of pivots 21, 23 rapidly approaches zero. Another reason for permitting the shock absorber to move a short distance away from its normal position before it starts to operate is to enable the one or other end of the axle to rise or fall without affecting the shock absorber, when the parts are otherwise in their normal position.

Said double-acting shock absorber 25 is provided with the usual horizontal crank shaft 28 which, in this particular installation, is disposed horizontally and longitudinally of the vehicle. Secured to and depending from said crank shaft 28 is the usual shock absorber crank arm 29 having the crank pin 30 at its outer or lower end. Pivoted at its outer end on said crank pin 30 is a shock absorber link 31 which is disposed horizontally and laterally of the vehicle. The inner end of said link 31 is pivoted at 32 to a bracket 33 which is suitably secured, by welding or otherwise, to the axle 14. This bracket is preferably so positioned that its pivot 32 lies in a vertical, longitudinal plane intersecting the center of said axle 14. With such an arrangement, when the one wheel 12 moves either up or down the effect produced upon the shock absorber 25 by the horizontal component of the motion of said pivot 32 is exactly the same as the effect produced upon said shock absorber by a similar up or down movement of the other wheel. Such horizontal movement of said pivot 32 due to such obliquity of the axle is actually so small that this factor may be neglected and said pivot 32 placed to the one or other side of the center line if this is desirable for other reasons. It is to be remembered, furthermore, that the shock absorber is constructed so that said pivot 32 has to move a short distance in the one or other direction away from central position before the shock absorber operates. This means that, in actual practice, a vertical movement of one end only of the axle does not affect the shock absorber.

The shock absorber 25 may be of any type which restrains horizontal movement of an axle, and in particular, which restrains a horizontal movement that is lateral with respect to the frame of the vehicle. It is to be understood that the word shock absorber includes any instrumentality which is capable of absorbing or dampening motion and is not elastic, i. e., which does not rapidly and completely return to its original shape when deformed. This definition includes those types of rubber which are not what is commonly termed elastic but which, when distorted, do not rapidly give the energy forces to which they are subjected.

Figure 4

In this construction is shown a modification of the invention, in which the horizontal, lateral movement of the axle 141 is definitely constrained. In this case the shock absorber 25 of Figs. 1-3 is eliminated. Secured to the frame 10 is a bracket 261 and secured to the axle 141 is a bracket 331. Pivotally connected at 301 and 321 to said bracket 261 and bracket 331 respectively is a long link 311 which is normally disposed horizontally and transversely relatively to the vehicle frame. This link permits either or both ends of the axle 141 to rise or fall but definitely controlling the horizontal lateral movement of said axle relatively to the vehicle frame. In this construction shock absorbers 191 and 191a are employed in a manner similar to that shown in Figs. 1-3.

Figures 5 and 6

In this construction the shock absorbers 19 and 19a of Figs. 1-3 and the shock absorbers 191 and 191a of Fig. 4 are entirely eliminated, their function being taken over by a pair of obliquely disposed shock absorbers 35 and 35a. The latter are pivotally connected at their upper ends at 36 and 36a to the vehicle frame 112 and at their lower ends at 37 and 37a to the axle 142.

These shock absorbers 35 and 35a are preferably and are here assumed to be of the type which, when contracted, cause a resilient, geometric cushioning of the imposed force due to the compressing of entrapped air located at the top of the shock absorber, and which, when expanded, cause an absorbing cushioning of some of the imposed force by means of restricted fluid flow. This geometric feature is, however, not essential in the particular type of spring suspension here illustrated, inasmuch as the torsion rods or springs 152, 152a exert a geometric force on the pivots 23 in the manner described in detail in my Patent No. 1,892,305 and in my pending patent application for Vehicle spring suspension, Ser. No. 713,161, filed February 27, 1934. Because of this fact, the obliquely disposed shock absorbers 35, 35a may be of the two-way, absorption type (with no resilient, entrapped air or other cushioning means) or of the one-way shock absorber or snubber type.

Because of disposition of these obliquely disposed shock absorbers 35, 35a, they are able to perform five distinct functions:—

1. One of these functions is to cushion the vertical, translational movement of the axle 142, by augmenting the resilient opposition of the main springs to upward axle movement and absorbing a portion of the forces causing downward axle movement so as to prevent the energy which is stored in the vehicle springs and entrapped shock absorber air from pushing the axle downward with excessive rapidity. This prevents "pitching" of the vehicle, which term may be defined as the translational periodic vibration or oscillation of the axle in a plane which is vertical and transverse of the vehicle.

2. Another function of these obliquely disposed shock absorbers is to prevent the pressures imposed upon the shock absorber from setting up "wheel tramp" oscillations in the axle. By the term "wheel tramp" is meant any periodic vibration or oscillation of an axle in a vertical, transverse plane, the term being most commonly used to denote an oscillation about an axis of rotation intermediate of the wheels. The creation of "wheel tramp" vibrations as a consequence of shock absorber pressures is prevented by the fact that the lines of pressure 42, 42a (emanating from or imposed upon the shock absorbers) intersect the roadway at a point located either at or beyond the intersections 39, 39a of their companion wheels 12, 12a with the roadway. Thus, when, for instance, wheel 12 is moved up or down, the axle 142 is caused to rotate about the intersection 39a and hence no vibrations set up in the axle about a point intermediate of the wheels and hence no wheel tramp, as far as the shock absorber pressures are concerned.

3. Another function of these shock absorbers 35, 35a is to dampen out such wheel tramp as does occur for any reasons whatsoever. This dampening out is effected by the action of each of the shock absorbers dampening the vertical movement of its companion end of the axle.

4. Another function of these obliquely disposed shock absorbers is to dampen out "axle shimmy", which term may be defined as the periodic vibration or oscillation of an axle in a direction that is horizontal and transverse of the vehicle. This action is due to the fact that the obliquity of the shock absorbers imposes horizontal component dampening forces upon the axle; these forces being analogous to the anti-axle shimmy arrangements shown in Figs. 1-4.

5. Another function of these obliquely disposed shock absorbers is to prevent "frame wobble" when the vehicle frame is travelling at relatively high speed over a relatively short obstacle or depression in the roadway. The term "frame wobble" may be defined as the periodic vibration or oscillation or any other movement of the vehicle frame about a horizontal longitudinal axle. This broad definition is employed because of the fact that any movement whatsoever of the frame and body is objectionable, whereas in the case of the axle and wheels it is not their movement, per se, which is of importance, but only the effect of such movement upon something else, as for instance the effect upon the body, or upon wheel traction, or smooth steering, etc.

This frame wobble is prevented as follows: In Fig. 5 the numeral 40 represents the one component of the center of gravity of the sprung weight of the vehicle which is situated directly over the axle 142, i. e., which lies in the same vertical transverse plane as said axle. To simplify the matter, it will be assumed that both the static and the kinetic components of the center of gravity are coincident and lie on the point 40. We will now assume that the one wheel 12 rides over a roadway obstacle and compresses its companion torsion spring 152. This will urge the vehicle frame 10 to move in a clockwise direction about an axis of rotation 41 situated somewhere in the area between the center of gravity component 40 and the other torsion spring 152a. Simultaneously with the creation of this clockwise force, the shock absorber 35 has been contracted, thereby creating an upward and inward force along the line 42 intersecting the pivots of said shock absorber 35. This line passes below the axis of rotation 41 and hence, under these particular conditions, urges the frame 10 to move in a counter-clockwise direction about the axis of rotation 41. It is obvious that if the entire spring suspension is correctly laid out for the particular weights and weight distributions involved, it follows that the clockwise force emanating from the supporting pivot 21 may be exactly counterbalanced by the counterclockwise force emanating from the shock absorber 35. At least this may be sufficiently approximated for an average speed over an average obstacle and for a set adjustment of the shock absorbers as to reduce frame wobble far below that of vehicles having conventional shock absorber arrangements.

When the converse occurs, and the wheel 12 drops into a hole, all of the forces are reversed. In this case the downward pressure on the supporting pivot 21 urges the frame 10 to rotate in a counter-clockwise direction about the axis of rotation 41 and this force is approximately counterbalanced by the clockwise force exerted by the downward and outward pull of the shock absorber 35 along the line 42. As the whole arrangement is symmetrical, it follows that the same action occurs when the other wheel 122a rises over an obstacle or drops into a depression.

When the vehicle travels at relatively low speed over a relatively long and high obstacle or into a relatively long and deep depression, it naturally follows that the actual forces involved as well as their effective lever arms about their axes of rotation are considerably altered. What occurs under such circumstances is shown graphically in Fig. 6. Here it will be seen that when one of the wheels, for instance wheel 12a, is pushed up very high, the distance between the line of thrust 42a and the axis of rotation 41a is much greater than in Fig. 5 and hence its effective lever arm urging the frame 112 in a clockwise direction is greater. This counterbalances the increased tendency toward counterclockwise rotation due to the greater resilient force set up in the torsion spring 152a.

Such a counterbalancing of variable forces also occurs when one of the wheels, for instance wheel 12, moves downwardly a considerable distance. In this case the distance between the axis of rotation 41 and the line of shock absorber thrust 42 is decreased, and this decrease in the clockwise force imposed upon the frame 10 counterbalances the decrease of pressure at pivot 21 due to the decrease in tension of the torsion spring 15.

For the best results, it is preferred, when the vehicle is in normal position as in Fig. 5, that the lines of force 42, 42a intersect the roadway a short distance outside of the intersections 39, 39a of their companion wheels with the roadway. The advantage of this is that even when the roadway is very rough and the lines of force 42, 42a are tilted, as in Fig. 6, said lines of force will never intersect the roadway at a point inside of their companion intersections 39, 39a.

Figure 7

In some installations, the arrangement shown in Figs. 5 and 6 is not completely effective, inasmuch as the one pair of shock absorbers is relied on to take care of four different spring suspension ills, namely: pitching, wheel tramp, axle shimmy and frame wobble. It is obvious that these various ills are cured by variables in spring suspension which, to some extent, are in conflict with each other. For instance, to cure axle shimmy might require such a "hard" shock absorber adjustment as to unduly interfere with free vertical axle movement.

One way of avoiding this difficulty is to separate some of these functions from the rest. In Fig. 7 is shown a pair of shock absorbers 43 and 43a whose principal function is to take care of pitching and wheel tramp. This result is obtained by reason of the fact that these shock absorbers are disposed substantially vertically between the frame 103 and axle 143 and hence are able to control just the vertical movements of the axle. Under certain circumstances the type of rotary shock absorber shown at 19, 19a in Fig. 1 may be arranged between the torsion rods 15 and 15a and the frame 10 in place of the just mentioned shock absorbers 43, 43a which are arranged directly between the axle and frame.

Another pair of shock absorbers 44, 44a are interposed between the frame and axle, but in this case disposed substantially horizontal. This arrangement permits said shock absorbers 44 and 44a to control just the horizontal axle movement and hence take care of axle shimmy, independently of the adjustment for pitching and wheel tramp.

Frame wobble is taken care of by so positioning the pairs of shock absorbers that the component of force exerted by each set on each side of the vehicle passes along a line of thrust 423 and 423a whose action is similar to the force along the lines 42 and 42a of Figs. 5 and 6. In some cases, frame wobble can be satisfactorily taken care of by the use of a single anti-axle-shimmy shock absorber such as that shown at 25 in Fig. 1 or even by the anti-axle-shimmy link 311 of Fig. 4, instead of by this pair of anti-axle-shimmy shock absorbers 44, 44a.

This Fig. 7 illustrates another refinement of the invention; namely, the use of one type of shock absorber 43, 43a for taking care of pitching and wheel tramp and another type of shock absorber 44, 44a for taking care of axle shimmy.

For instance, axle shimmy is ordinarily best taken care of by pure absorption of the forces involved. Hence, it is ordinarily best to have the shock absorbers 44, 44a of the pure absorption type. In regard to the shock absorbers 43, 43a, however, a different condition obtains. Here it is common practice to use entrapped air to resiliently oppose rapid upward axle movement. Shock absorbers of this type may be called resilient-absorbent shock absorbers and this type can be used at 43 and 43a without affecting the pure absorption characteristics of the anti-wheel shimmy shock absorbers 44, 44a.

All of the shock absorbers mentioned in this patent specification are preferably of the type which offer substantially no resistance to either fast or slow small movements and offer also substantially no resistance to large slow movements, but do offer resistance to large fast movements.

Figure 8

This form of the invention is similar to the construction of Figs. 1-3 in that horizontal, lateral movement of the axle 144 relatively to the vehicle frame 104 is resisted by a shock absorber 254. In this case, however, instead of said shock absorber being interposed between the axle and the vehicle frame, as in Figs. 1-3, it is interposed between the axle and the cross steering link 45. The purpose of this construction is to prevent gyroscopic forces from reaching the steering drag link 46. This gyroscopic action occurs as follows: With the vehicle traveling along the roadway, let it be assumed that the right front wheel 12 moves vertically upward a sufficient distance so that it entirely loses contact with the roadway. This means that the spindle of this wheel 12 is moving vertically while the wheel is rotating and this causes a gyroscopic effect which in this case takes the form of a force on said wheel spindle tending to turn it horizontally forward about its substantially vertical spindle pin 47 as an axis. This tends to cause the rear end of the steering arm 48 to move outwardly and the cross steering link 45 to move in a like direction. If such a gyroscopic force is not otherwise taken care of, it will jerk the drag link 46 forwardly. Such a jerk would cause detrimental vibration and pounding of the steering mechanism and would also be annoying to the operator of the vehicle because the manual steering wheel (not shown) which he is grasping would receive a sharp jerk as a consequence of this gyroscopic force, it being common knowledge that most steering gears are not strictly "irreversible", and that, therefore, movements of said drag link 46 are transmitted to some extent to the manual steering wheel.

One method of absorbing such a gyroscopic force is by the construction shown in this Fig. 8 is which said shock absorber 254 receives the force which is tending to move the cross steering link 45 and, instead, delivers said force to the axle 144.

It is to be admitted that under these conditions said axle 144 receives a force which is lateral relatively to the frame of the vehicle, and that furthermore, said force is received at a most disadvantageous moment,—namely, when the one wheel (12) is clear off the ground. Such a method of absorbing a gyroscopic force is therefore deemed not to be the best way of accomplishing this result, particularly in the case of such a construction as that preferred by the present inventor, in which the axle 144 is preferably free to move transversely relatively to the main vehicle frame. And even when said axle is positively prevented from moving laterally with respect to said main frame, as in the case of a conventional spring suspension, such a lateral force is considered objectionable for the following reasons: A. It acts laterally at one end of the vehicle and hence is twice as detrimental as a like force directed longitudinally upon the vehicle frame, B. It acts laterally at the front end of the vehicle and hence is most deleterious to accurate steering control of the vehicle, and C. Any lateral force is well known to be more objectionable to the passengers than a longitudinal force of like amount, due to the fact that a lateral force moves the passengers to an uncomfortable position requiring manual effort to be resisted and corrected.

Figures 9–11

The preferred method of absorbing gyroscopic forces is to allow the one end of the axle to move longitudinally a limited amount forwardly or rearwardly relatively to the vehicle frame and to provide means for returning said one end of said axle to its normal position after the gyroscopic force has been spent. The particular end of the axle which is thus rendered free to move a limited amount longitudinally is that end which is adjacent the steering drag link 515. This freedom of movement is effected in the present invention as follows:

Arranged in the outer end of each crank arm 205 is a relatively long, horizontal, longitudinal, supporting sleeve 53 in which is suitably journaled (preferably on ball bearings) a supporting pivot pin 215. Welded at 54 to the front end of said supporting pivot pin, forwardly of said supporting sleeve 53, is a front supporting head 55 of approximately cubical shape. Rearwardly of said supporting sleeve 53 is a rear supporting head 55' which is clamped against a spacing collar 56 and to said supporting pivot pin 215 by means of a clamp nut 57 and a lock nut 58, or by any other suitable means. Said front and rear supporting heads 55 and 55' are provided with the truncated conical supporting trunnions or kick pivots 60 and 60' respectively, the axes of said supporting kick pivots being horizontal and transverse of the vehicle. Said supporting kick pivots are suitably journaled in the lower ends of companion front and rear shackles 61 and 61'. The upper ends of said shackles are suitably journaled on companion, conical, spindle trunnions or kick pivots 62 and 62' which project horizontally and laterally out from companion, spindle heads 63 and 63'. The latter are secured to the spindle pivot pin 235 in substantially the same manner that the supporting heads 55 and 55' are secured to the supporting pivot pin 215. Said spindle pivot pin 235 is disposed horizontally and longitudinally of the vehicle and is suitably journaled in a relatively long spindle sleeve 64 which is formed at the upper end of a spindle bracket 245a secured at its lower end to the axle 145.

By this construction the supporting pivot pin 215 and the spindle pivot pin 235 are at all times maintained parallel to each other, and remain in one common plane but are capable of moving endwise with respect to each other. At the same time said pivot pins are journaled in the outer ends of the crank arm 205 and spindle bracket 245a and are thereby capable of oscillating relatively thereto. Thus either end of the axle is free to rise or fall without any "rolling" of the axle or change of spindle pin caster. Nevertheless, the one (left) end of the axle is free to move a limited distance forwardly or rearwardly.

This means that the gyratory horizontal force resulting from an upward or a downward movement of either wheel, when out of contact with the roadway, will cause a tension or compression in the steering cross link 455. Under these particular conditions it may be assumed that the drag link 465 and its pivot 65 are stationary, with the result that the tension or compression on the steering cross link 455 causes the left end of the axle to be kicked a short distance forwardly or backwardly. The principal resistance to such a gyration kick is the inertia of the left end of the axle together with the rest of the unsprung weight immediately connected therewith. It is to be noted in this connection that, when either of the vehicle wheels leaves the road, it forces the left end of the axle in the one longitudinal direction, and then when said vehicle wheel drops back to the road it forces said left end of said axle in a reverse direction, thereby substantially returning said left end of said axle to the position it had just prior to the time the wheel left the road.

Despite this balancing of the up and down gyration forces, it is desirable to definitely urge the left end of the axle to a central or normal position. This is accomplished in the present invention in two independent manners which augment each other. One of these centralizing forces is the result of the fact that the spindle pivot pin 235 is located above the supporting pivot pin 215. This means that the force of gravity is constantly tending to longitudinally push the spindle kick pivots 62, 62' to the position where they are vertically above the supporting kick pivots 60, 60'.

This centralizing force due to gravity has the one defect of being subject to periodic vibration and hence it is deemed advisable to augment said gravity centralizing force by another force which will dampen any periodic vibrations. The preferred way of accomplishing this result is to provide a pair of rubber blocks 66 and 66' on the rear end of the supporting pivot pin 215 between the lock nut 58 and the end nut 67. Said rubber blocks 66 and 66' are flanked by a pair of small washers 68 and 68' having their inner corners rounded outside of which are disposed a pair of large diametered backing washers 70 and 70'. Immediately between the rubber blocks 66 and 66' is a centering arm 71, the upper end of which is clamped between the clamp nut 72 and lock nut 73 of the spindle pivot pin 235. When said centering arm 71 and hence the left end of the axle 145 is disposed longitudinally in its central or normal position relatively to the frame 105, said centering arm is just in contact with but is not compressing either of the rubber blocks 66 and 66', or at least is only compressing them to a very moderate extent. Thus, when a horizontal gyration force causes the left end of the front axle 145 to be jerked forwardly or rearwardly, such a movement is not only resisted by the inertia of the axle itself and by the weight of the body urging the pivots 60 and 60' to a central position, but is also resisted to a small extent by the one or other of the rubber blocks 66 and 66'. And any tendency of said left end of the axle to vibrate horizontally is damped by said rubber blocks. This is because rubber does not give back as much power as it receives, this being chiefly due, probably, to the fact that rubber has the characteristics of a liquid in that it is deformable but is not compressible.

This characteristic is also the reason for the employment of the round-shouldered, small washers 68 and 68' which permit the centering arm 71 to at first move away from its normal position with little resistance on the part of the one or other of said blocks, as a consequence of the fact that the peripheral portions of the outer faces of each block is unsupported when the block is only subjected to a moderate pressure. As this pressure increases, however, the said peripheral portion of the outer face of said block flows over the rounded edge of its companion small washers 68 or 68' and rolls into contact with the adjacent face of its companion backing washers 70, 70'. Thereafter the resistance of said rubber block becomes much greater as a consequence of the fact that it is no longer deformable longitudinally but only deformable laterally.

An excessively heavy longitudinal displacement of the axle bracket 245a relatively to the crank arm 205 should, of course, be prevented from excessively deforming the rubber blocks 66, 66' and also from putting excessive strains on the bearings associated with the pivot pins 235 and 215. This is effected in the present invention by a pair of segmental limiting lugs 75, 75' formed on the under face of the spindle sleeve 64 and adapted to make contact with a pair of segmental limiting lugs 76, 76' formed on the upper face of the supporting sleeve 53.

While I have shown several specific embodiments of my invention it will be appreciated that the invention is not limited to any specific embodiment shown but is to be accorded the full range of equivalents comprehended by the accompanying claims. In particular, by the term "shock absorber" as used in the specification and claims is meant any mechanism having the function of a shock absorber and hence any means for cushioning the lateral movement of the cross bar.

I claim as my invention:

1. A vehicle spring suspension comprising: a vehicle frame; a supporting pivot resiliently connected with said frame; a spindle having a wheel journaled thereon; a link pivoted at its upper end on said spindle and at its lower end on said supporting pivot and extending upwardly and inwardly from said supporting pivot; and a shock absorber interposed between said spindle and said frame and adapted to resist horizontal movement of said spindle relatively to said frame.

2. A vehicle spring suspension comprising: a vehicle frame; a frank arm journaled longitudinally on said frame and having a supporting pivot; means for resiliently restraining rotation of said crank arm; a spindle having a wheel journaled thereon; a link pivoted at its upper end on said spindle and at its lower end on said supporting pivot and extending upwardly and inwardly from said supporting pivot; and a shock absorber interposed between said spindle and said frame and adapted to resist horizontal movement of said spindle relatively to said frame.

3. A vehicle spring suspension comprising: a vehicle frame; a pair of crank arms connected together and journaled longitudinally on said frame and each having a supportidng pivot; means for resiliently restraining rotation of said crank arms; a spindle having a wheel journaled thereon; links pivoted at their upper ends on said spindle and at their lower ends on said supporting pivots and extending upwardly and inwardly from said supporting pivots; and a shock absorber interposed between said spindle and said frame and adapted to resist horizontal movement of said spindle relatively to said frame.

4. A vehicle spring suspension comprising: a vehicle frame; a torsion rod arranged longitudinally on said frame and anchored at one of its ends to said frame; a crank arm arranged at the other end of said torsion rod and having a supporting pivot; a spindle having a wheel journaled thereon; a link pivoted at its upper end on said spindle and at its lower end on said supporting pivot and extending upwardly and inwardly from said supporting pivot; and a shock absorber interposed between said spindle and said frame and adapted to resist horizontal movement of said spindle relatively to said frame.

5. A vehicle spring suspension comprising: a vehicle frame; a supporting pivot resiliently connected with said frame; a spindle having a wheel journaled thereon; a link pivoted at its upper end on said spindle and at its lower end on said supporting pivot and extending upwardly and inwardly from said supporting pivot; and an oblique shock absorber interposed between said spindle and said frame.

ALBERT F. HICKMAN.